US012633704B2

(12) United States Patent
Saito

(10) Patent No.: US 12,633,704 B2
(45) Date of Patent: May 19, 2026

(54) CONNECTOR WITH A CPA MEMBER

(71) Applicant: Yazaki Corporation, Tokyo (JP)

(72) Inventor: Hideki Saito, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 361 days.

(21) Appl. No.: 18/441,217

(22) Filed: Feb. 14, 2024

(65) Prior Publication Data

US 2024/0291206 A1 Aug. 29, 2024

(30) Foreign Application Priority Data

Feb. 24, 2023 (JP) ................................ 2023-027268

(51) Int. Cl.
*H01R 13/641* (2006.01)
*H01R 13/627* (2006.01)
*H01R 13/639* (2006.01)

(52) U.S. Cl.
CPC ....... *H01R 13/641* (2013.01); *H01R 13/6272* (2013.01); *H01R 13/639* (2013.01)

(58) Field of Classification Search
None
See application file for complete search history.

(56) References Cited

U.S. PATENT DOCUMENTS 6,435,895 B1 * 8/2002 Fink .................. H01R 13/6272 439/352
2015/0222055 A1 * 8/2015 Plazio .................. H01R 13/639 439/347
2020/0136311 A1 4/2020 Narama
2022/0059970 A1 * 2/2022 Shiga ................. H01R 13/6272
2022/0123501 A1 * 4/2022 Denz .................. H01R 13/6272

FOREIGN PATENT DOCUMENTS

JP 2020-72013 A 5/2020

* cited by examiner

*Primary Examiner* — Oscar C Jimenez
(74) *Attorney, Agent, or Firm* — Sughrue Mion, PLLC

(57) ABSTRACT

The connector 1 includes a connector body 11 and a CPA member 12. A pair of CPA-side protrusions 123 is provided on each of side edges 122*c*, constituting a pair, of a CPA arm 122 of the CPA member 12. A pair of housing-side protrusions 113 is formed in a protruding manner, on a CPA movement surface 112*a* of a CPA-receiving portion 112 of a housing 11*a* of the connector body 11, at such a position that the pair of housing-side protrusions 113 does not overlap with the CPA arm 122 in a top view of the CPA movement surface 112*a* and that the pair of housing-side protrusions 113 comes into contact with the pair of CPA-side protrusions 123 in a temporarily locked state and comes out of contact with the pair of CPA-side protrusions 123 in a fully locked state.

5 Claims, 5 Drawing Sheets

CONNECTOR WITH A CPA MEMBER

TECHNICAL FIELD

The present invention relates to a connector in which a Connector Position Assurance (CPA) member is attached to a connector body to ensure mating with a mating connector.

BACKGROUND

Conventionally, a connector is known in which a CPA member is attached to the connector body to ensure mating with a mating connector (for example, see Patent Document 1). The CPA member of Patent Document 1 is attached to a housing in a temporarily locked state, and movement in the mating direction is inhibited before mating. Then, when the connector body and the mating connector are fitted together, the inhibition of the CPA member is released to allow the CPA member to move. When the mating is completed, a worker moves the movable CPA member to enter the fully locked state. In this connector, since the CPA member is in the fully locked state, mating with the mating connector is guaranteed.

In the above-mentioned CPA member, the movement inhibition in the temporarily locked state and the full locking to the housing in the fully locked state are performed by a CPA arm formed in a cantilever shape. In the temporarily locked state, the CPA arm comes into contact with the housing on the distal end side, thereby inhibiting movement of the CPA member. When the mating connector is mated, the CPA arm is bent and the tip side is removed from the housing to release the movement inhibition and allow movement by operation of the worker.

RELATED ART

Patent Document

[Patent Document 1] JP 2020-072013 A

SUMMARY OF THE INVENTION

Problem to be Solved by the Invention

Here, in many of the connectors with a CPA member as described above, the CPA member is attached in a temporarily locked state while they are carried. When such a connector is transported, some external force may be applied to the CPA arm, causing the CPA arm to become bent. Such unintended deflection of the CPA arm may cause deformation of the CPA arm if the deflection is too large, or may release the movement inhibition of the CPA member in the temporarily locked state before mating with the mating connector, which are not desirable.

Therefore, the present invention focuses on the above-mentioned problems and aims to provide a connector that can suppress unintended deflection of the CPA arm of the CPA member in the temporarily locked state.

Solution to Problem

In order to solve the above problems, a connector includes a connector body in which a connector terminal is accommodated in a cavity of a housing, and a CPA member configured to be attached to the housing in a temporarily locked state and configured to, before mating of the connector body with a mating connector, inhibit movement in a movement direction along a mating direction, the CPA member being configured to, when the inhibition is released by the mating, transit to a fully locked state by moving in the movement direction, so that the CPA member guarantees the mating, wherein the CPA member includes: a CPA body configured to temporarily lock to the housing and receive a transition operation to the fully locked state on a rear side in the movement direction; a CPA arm being a cantilever extending in the movement direction from the CPA body, the CPA arm configured to, before the mating, inhibit the movement by bringing an end portion on a free end side of the CPA arm to come into contact with the housing, and configured to release the inhibition due to the mating and make a full lock at the end portion; and a pair of CPA-side protrusions protruding in a width direction of the CPA arm from an intermediate position between the fixed end side and the free end side on each of side edges, constituting a pair, of the CPA arm, wherein the housing includes: a housing body provided with the cavity; a CPA-receiving portion that defines, of an outer peripheral surface of the housing body, a CPA-receiving space for receiving the CPA member, with a bottom surface of the CPA-receiving space being a CPA movement surface on which the CPA member moves, the CPA body temporarily locking to the CPA-receiving portion in the temporarily locked state, and the end portion of the CPA arm fully locking to the CPA-receiving portion in the fully locked state; and a pair of housing-side protrusions formed in a protruding manner on the CPA movement surface at such a position that the pair of housing-side protrusions does not overlap with the CPA arm in a top view of the CPA movement surface and that the pair of housing-side protrusions comes into contact with the pair of CPA-side protrusions in the temporarily locked state and comes out of contact with the pair of CPA-side protrusions in the fully locked state.

Advantageous Effects of the Invention

According to the above connector, unintended deflection of a CPA arm of a CPA member in the temporarily locked state can be alleviated.

DETAILED DESCRIPTION OF THE EXEMPLARY EMBODIMENT

An embodiment of a connector will be described below.

Figure 1:
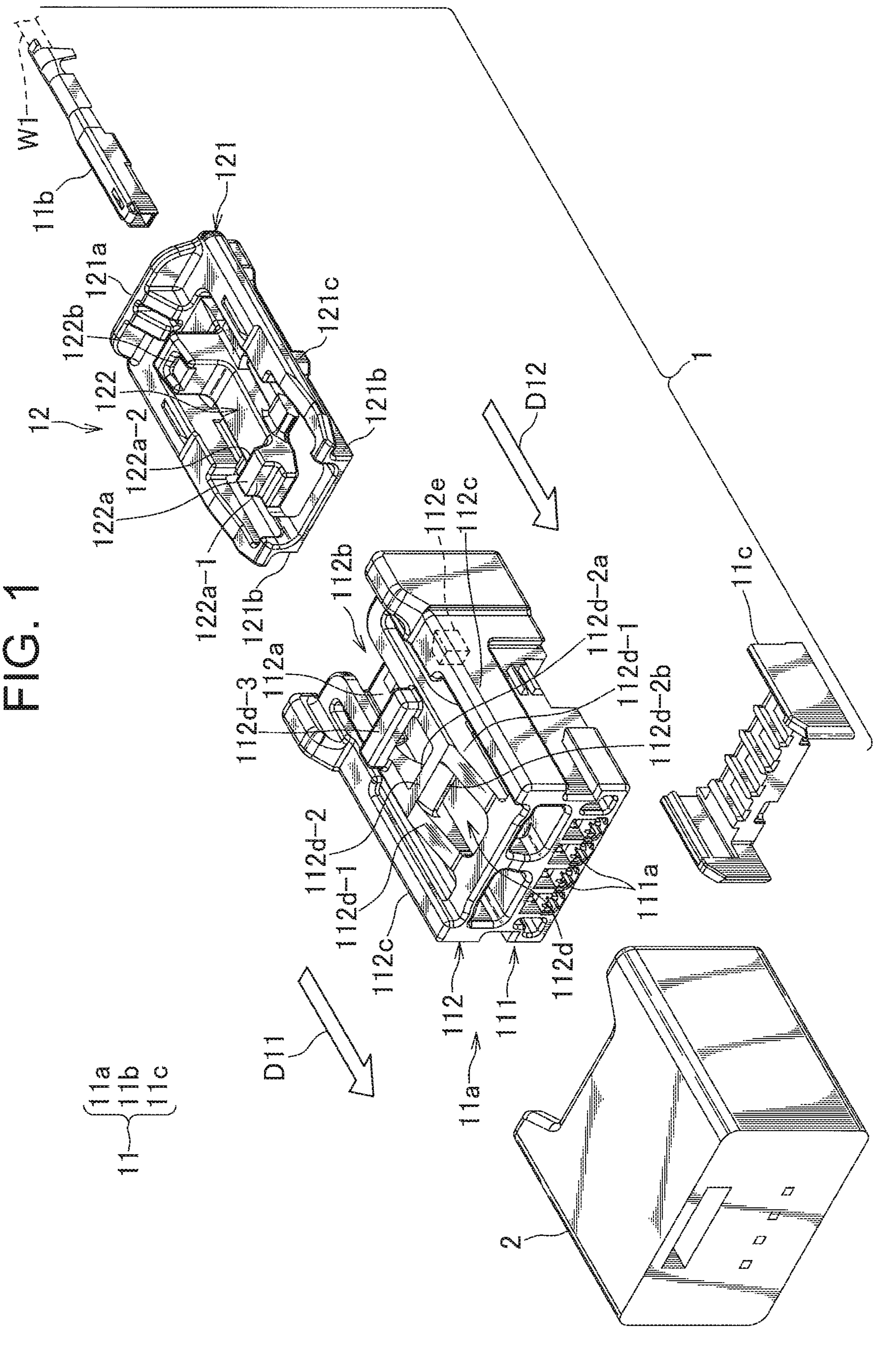
FIG. 1 is an exploded perspective view illustrating a connector according to an embodiment as well as a mating connector.

FIG. 1 is an exploded perspective view illustrating a connector 1 according to an embodiment as well as a mating connector 2.

The connector 1 according to the present embodiment is used, for example, as an end connector of a wire harness mounted on a vehicle or the like. The mating connector 2 is provided in a mating device or a mating wire harness to which the wire harness in question is connected. Further, in the present embodiment, the connector 1 is a female connector having an appearance of a rectangular block shape, and the mating connector 2 is a male connector in a rectangular block shape, to which the connector 1 can be connected.

The connector 1 includes a connector body 11 and a CPA member 12. The connector body 11 has connector terminals 11*b* housed in cavities 111*a* of a housing 11*a*. The housing 11*a* is a member made of insulating resin that has an appearance of a rectangular block shape and has the multiple rectangular cylindrical cavities 111*a* formed inside. The connector terminal 11*b* is a female terminal made of a conductive metal that is crimped and connected to an end of an electric wire W1 and formed into a rectangular tube shape by sheet metal processing. A single connector terminal 11*b* is housed in each of the cavities 111*a* of the housing 11*a*.

Furthermore, the connector body 11 includes a spacer 11*c*. The spacer 11*c* is a member made of insulating resin that is inserted through a slit formed on one side of a housing body 111 in a rectangular block shape. When this spacer 11*c* is inserted into the housing body 111, the connector terminal 11*b* in each cavity 111*a* is pressed in the insertion direction, and each connector terminal 11*b* is fixed so as not to come out of the cavity 111*a*.

A CPA member 12 is a resin member that is attached to the housing body 111 in the temporarily locked state, and after the connector body 11 is fitted to the mating connector 2, shifts to the fully locked state to ensure the mating. Before the connector body 11 is fitted to the mating connector 2, the CPA member 12 is inhibited from moving in a movement direction D12 along the mating direction D11, and this inhibition is released upon mating. When the mating of the connector body 11 to the mating connector 2 is completed, the worker confirms the mating by pushing the CPA member 12 in the movement direction D12 to shift to the fully locked state.

The housing 11*a* in the connector body 11 includes: the housing body 111 in which the cavities 111*a* are provided; and a CPA-receiving portion 112 that receives the CPA member 12. The CPA-receiving portion 112 defines, on the outer peripheral surface of the housing body 111, a CPA-receiving space 112*b* that receives the CPA member 12, with a bottom surface of the CPA-receiving space 112*b* being a CPA movement surface 112*a* on which the CPA member 12 moves. This CPA-receiving portion 112 includes: a pair of side wall ribs 112*c* that are erected on a pair of side edges, along the movement direction D12, of the CPA movement surface 112*a*; and a mating locking arm 112*d* that extends between the side wall ribs 112*c* to face the CPA movement surface 112*a*.

In the mating locking arm 112*d*, a rear side in the movement direction D12 is connected to the pair of side wall ribs 112*c*, a front side is connected to the CPA movement surface 112*a*, and a central part is configured to have deflection deformation. The mating locking arms 112*d* includes arm portions 112*d*-1, constituting a pair, each extending along the side wall ribs 112*c*, the arm portions 112*d*-1 being connected, on the rear side in the movement direction D12, to the side wall ribs 112*c*, and the arm portions 112*d*-1 being connected, on the front side in the movement direction D12, to the CPA movement surface 112*a* at positions closer to the side wall ribs 112*c*. A locking bridge 112*d*-2 connects the central portions of the arm portions 112*d*-1 constituting the pair. During mating with the mating connector 2, the mating connector 2 is locked to a locking end face 112*d*-2*a*, which is an end face of the locking bridge 112*d*-2 on the rear side in the movement direction D12, so that the mating state is stabilized.

Furthermore, on the rear side of the locking bridge 112*d*-2, a lock release operation-receiving portion 112*d*-3 is provided, in the form of a bridge, between the arm portions 112*d*-1 constituting the pair. During releasing of mating, a worker performs a lock release operation on the lock release operation-receiving portion 112*d*-3 to detach the locking end face 112*d*-2*a* from the mating connector 2 by deflecting the mating locking arm 112*d*. The lock release operation-receiving portion 112*d*-3 is formed such that the height of the lock release operation-receiving portion 112*d*-3 from the CPA movement surface 112*a* is greater than the height of the locking bridge 112*d*-2, so that the worker can readily perform the lock release operation.

The CPA member 12 is a member having an appearance of a generally rectangular plate shape, and is inserted into the CPA-receiving space 112*b* such that it is introduced between the CPA movement surface 112*a* and the mating locking arm 112*d* in the CPA-receiving portion 112. Before mating with the mating connector 2, the CPA member 12 will be in the temporarily locked state explained below in the CPA-receiving space 112*b*.

Figure 2:
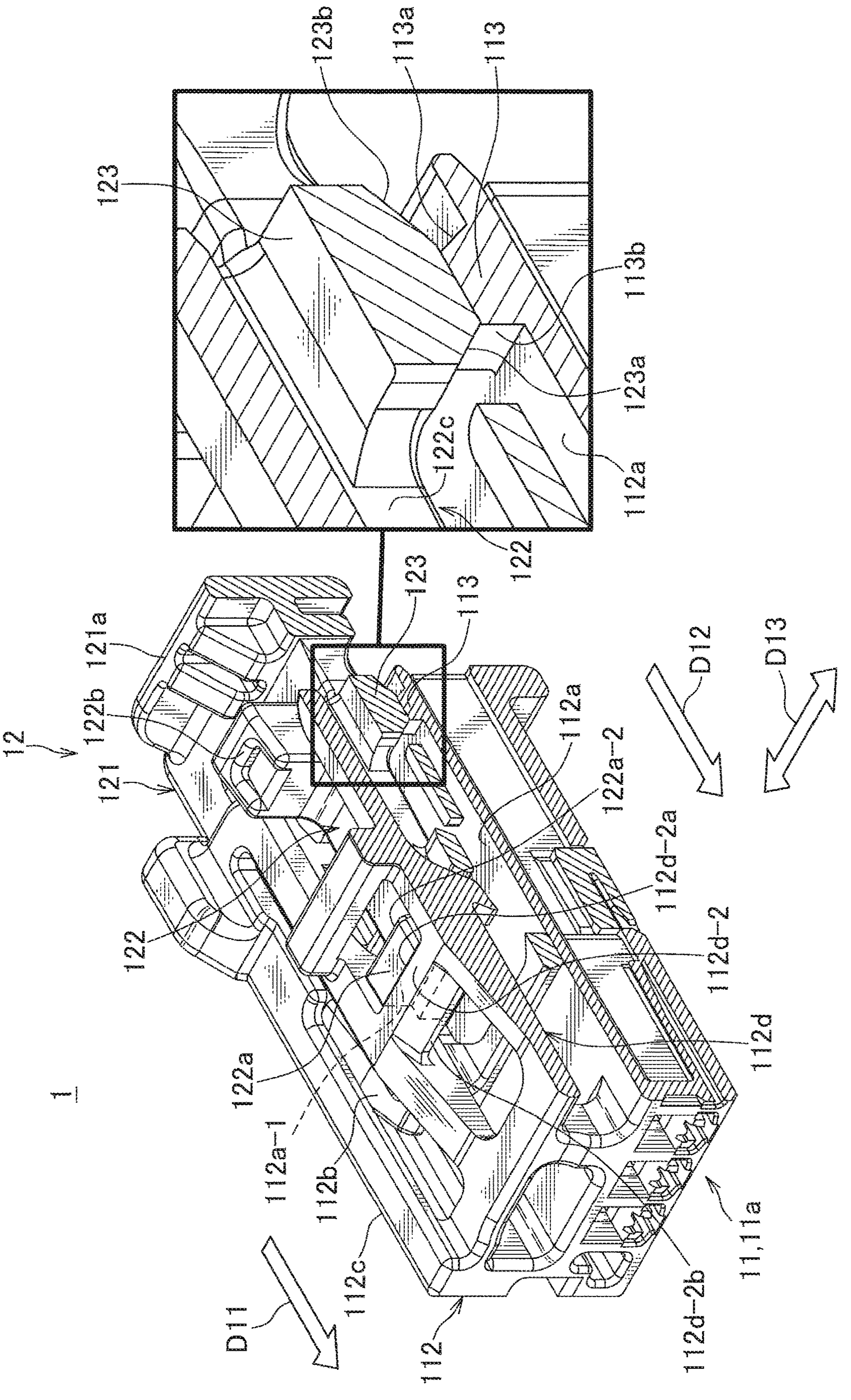
FIG. 2 is a cut perspective view illustrating a state in which a CPA member is attached in a CPA-receiving space illustrated in FIG. 1 in the temporarily locked state, as well as a cross section passing through a mating locking arm.
Figure 3:
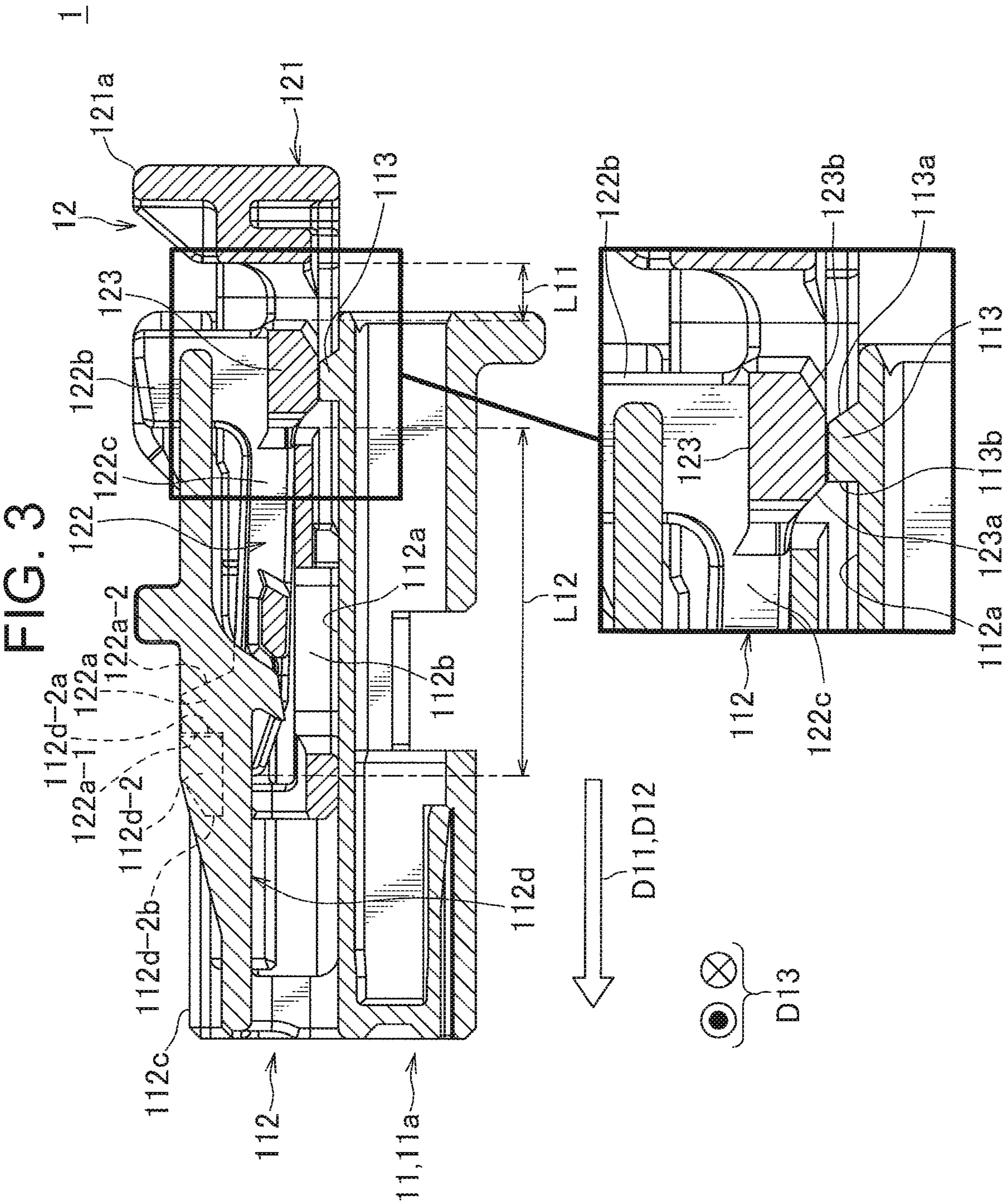
FIG. 3 is a sectional view illustrating the cross section illustrated in FIG. 2.

FIG. 2 is a cut perspective view illustrating a state in which the CPA member 12 is attached in the CPA-receiving space 112*b* illustrated in FIG. 1 in the temporarily locked state, as well as a cross section passing through the mating locking arm 112*d*. FIG. 3 is a sectional view illustrating the cross section illustrated in FIG. 2. Hereinafter, the CPA member 12 is explained with reference to FIG. 1, as well as FIG. 2 and FIG. 3.

First, the CPA member 12 has a CPA body 121 formed in a rectangular frame shape and provided with a full lock operation-receiving portion 121*a*, on the rear side in the movement direction D12 along the mating direction D11, for receiving a transition operation to the fully locked state. CPA-side temporary locking protrusions 121*c* for temporarily locking to the housing 11*a* are provided on the outer surfaces of the side frame portions 121*b*, constituting a pair, that are provided along the movement direction D12 of the CPA body 121. In the CPA-receiving portion 112 of the housing 11*a*, housing-side temporary locking protrusions 112*e* to which the CPA-side temporary locking protrusions 121*c* lock are provided on the inner surfaces of the side wall ribs 112*c* constituting the pair. When the pair of CPA-side temporary locking protrusions 121*c* lock to the pair of housing-side temporary locking protrusions 112*e*, the CPA body 121, thus the CPA member 12, temporarily locks to the housing 11*a*, and therefore, Furthermore, the CPA member 12 includes a CPA arm 122 in a cantilever shape extending inside the rectangular frame-shaped CPA body 121 in the movement direction D12. The rear side of the CPA arm 122 in the movement direction D12 is a fixed end, and the front side is a free end. An end portion protrusion 122*a* protruding toward the side opposite from the CPA movement surface 112*a* is formed on the end portion of the CPA arm 122 on the free end side. Before mating, a movement inhibition end face 122*a*-1, which is the end face of the end portion protrusion 122*a* on the front side in the in the movement direction D12, comes into contact with the locking end face 112*d*-2*a* of the mating locking arm 112*d* of the housing 11*a*. Due to the movement inhibition end face 122*a*-1 coming into contact with the locking end face 112*d*-2*a*, the CPA arm 122 inhibits the CPA member 12, in the temporarily locked state before mating, from moving in the movement direction D12.

When the mating connector 2 is mated, this mating connector 2 pushes the end portion protrusion 122*a* toward the CPA movement surface 112*a*, and the movement inhibition end face 122*a*-1 is detached from locking end face 112*d*-2*a*, so that the movement inhibition in the temporarily locked state is released. Then, when the worker puts his finger on the full lock operation-receiving portion 121*a* and pushes the CPA member 12 in the movement direction D12, the end portion protrusion 122*a* of the CPA arm 122 passes under the locking bridge 112*d*-2 of the mating locking arm 112*d* to the front side in the movement direction D12. When the CPA arm 122 springs back upon passing under the locking bridge 112*d*-2, the full lock end face 122*a*-2, i.e, the end face of the end portion protrusion 122*a* on the rear side in the movement direction D12, locks to the full lock-receiving portion 112*d*-2*b*, i.e., the end portion of the locking bridge 112*d*-2 on the front side in the movement direction D12. The fully locked state of the CPA member 12 with respect to the housing 11*a* means a state in which the full lock end face 122*a*-2 of the CPA arm 122 locks to the full lock-receiving portion 112*d*-2*b* of the mating locking arm 112*d*. As described above, when the movement inhibition is released due to mating of the mating connector 2, the CPA arm 122 fully locks to the housing 11*a*.

The CPA arm 122 has a full lock release-receiving portion 122*b* formed in a protruding manner at an intermediate position between the fixed end side and the free end side on the outer surface opposite from the CPA movement surface 112*a*. The full lock release-receiving portion 122*b* is a portion on which the worker performs a full lock release operation to deflect the CPA arm 122 to release the full lock of the full lock end face 122*a*-2 in the fully locked state. In the full lock release operation, the worker pushes the full lock release-receiving portion 122*b* toward the CPA movement surface 112*a*, so that the full lock end face 122*a*-2 is detached from the full lock-receiving portion 112*d*-2*b* to release the full lock.

Furthermore, the CPA arm 122 is provided with a pair of CPA-side protrusions 123. The CPA-side protrusions 123 constituting the pair are portions provided at the intermediate position between the fixed end side and the free end side on the side edges 122*c* constituting the pair of the CPA arm 122, the CPA-side protrusions 123 formed to protrude in a width direction D13 of the CPA arm 122. Each of the CPA-side protrusions 123 has a square prism shape with a pair of corners on the side of the CPA movement surface 112*a* being chamfered. The CPA-side protrusions 123 constituting the pair protrude from a position adjacent to the full lock release-receiving portion 122*b* on the side edges 122*c* constituting the pair of the CPA arm 122. As illustrated in FIG. 3, the CPA arm 122 is formed such that a length L12 of a portion between the CPA-side protrusions 123 and the free end side is a length L11 of a portion between the CPA-side protrusions 123 and the fixed end side.

On the housing 11*a*, a pair of housing-side protrusions 113 is formed, as a portion corresponding to the pair of CPA-side protrusions 123, in a protruding manner on the CPA movement surface 112*a*. The pair of housing-side protrusions 113 does not overlap with the CPA arm 122 on the CPA movement surface 112*a* in a top view of the CPA movement surface 112*a*, and is provided at a position in contact with the pair of CPA-side protrusions 123 in the temporarily locked state. The positions where the housing-side protrusions 113 are formed are positions that come out of contact with the CPA-side protrusions 123 in the fully locked state.

Furthermore, in the present embodiment, a chamfered portion of each of the CPA-side protrusions 123 on the front side in the movement direction D12 is a CPA front side-inclined surface 123*a* that is inclined such that the distance from the CPA movement surface 112*a* gradually increases in the movement direction D12. Each of the housing-side protrusions 113 is provided with, on the rear side in the movement direction D12, a housing-side-inclined surface 113*a* that is inclined such that the protrusion height from the CPA movement surface 112*a* gradually increases in the movement direction D12.

Furthermore, a chamfered portion of each of the CPA-side protrusions 123 on the rear side in the movement direction D12 is formed with a CPA rear side-inclined surface 123*b* that is inclined such that the distance from the CPA movement surface 112*a* gradually decreases in the movement direction D12. An end face of each of the housing-side protrusions 113 on the front side in the movement direction D12 is a housing-side non-inclined surface 113*b* that rises substantially vertically from the CPA movement surface 112*a*.

Figure 4:
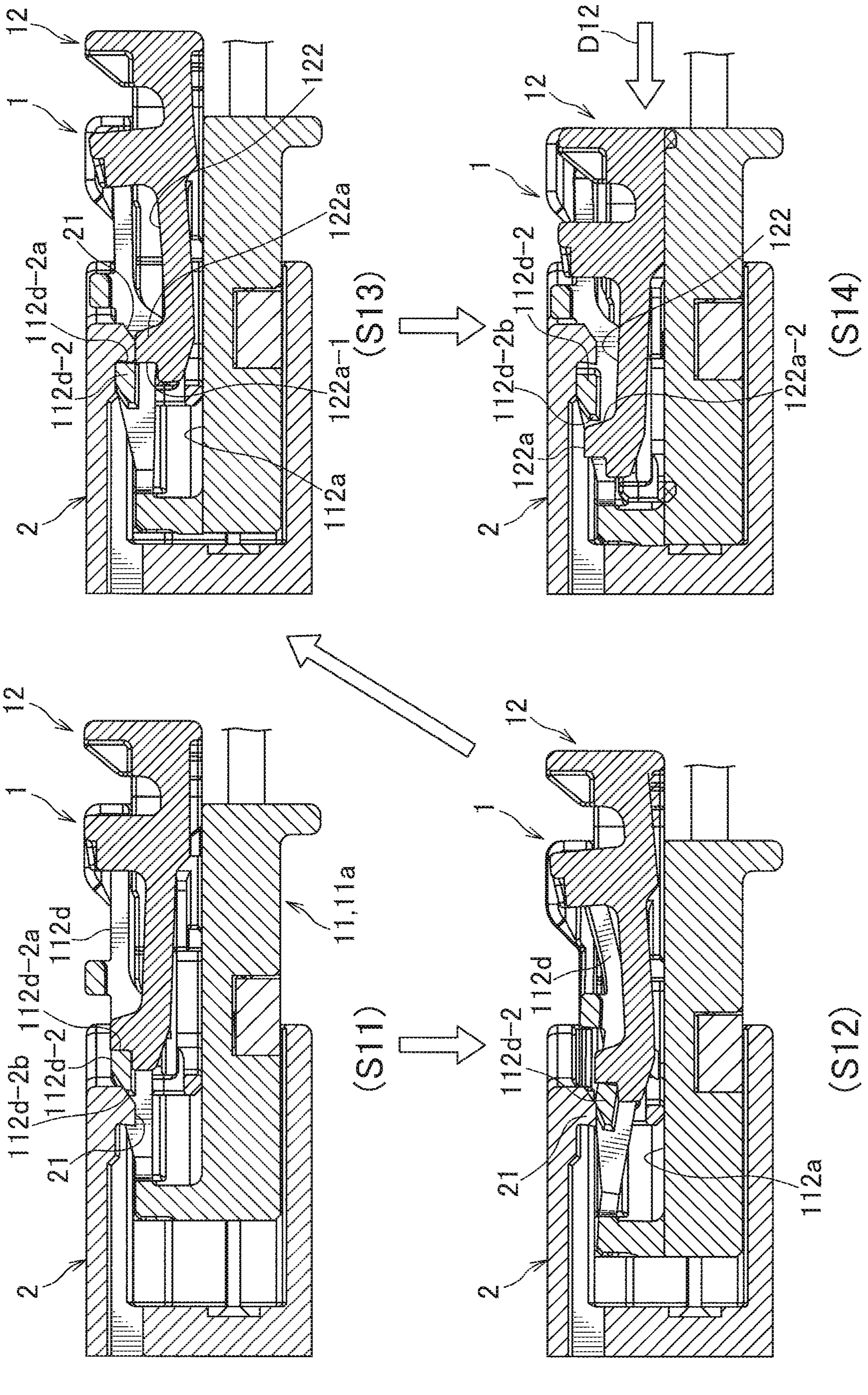
FIG. 4 is sectional views, taken along a plane passing the CPA arm, illustrating movement of each portion from when a mating connector is fitted to the connector illustrated in FIG. 1 to when the CPA member is locked into a fully locked state.
Figure 5:
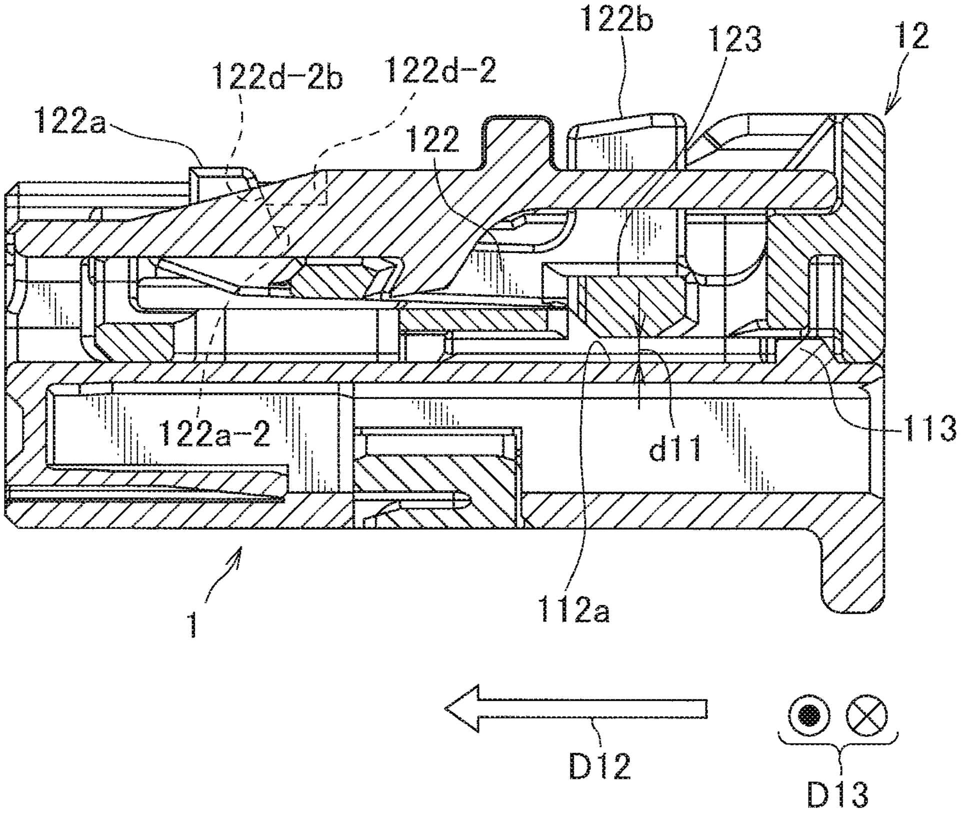
FIG. 5 is a sectional view, taken along a plane passing through a CPA-side protrusion and a housing-side protrusion, of the connector that has transitioned to the fully locked state.

FIG. 4 is sectional views, taken along a plane passing the CPA arm, illustrating movement of each portion from when a mating connector is fitted to the connector illustrated in FIG. 1 to when the CPA member is locked into a fully locked state. FIG. 5 is a sectional view, taken along a plane passing through the CPA-side protrusion and the housing-side protrusion, of the connector that has transitioned to the fully locked state.

In a first step S11 of FIG. 4, the CPA member 12 is attached to the connector body 11 of the connector 1 in the temporarily locked state. Then, mating of the mating connector 2 with the connector 1 starts. An opening of the mating connector 2 on the mating side is formed with a mating-side lock portion 21 for locking to the locking end face 112*d*-2*a* of the mating locking arm 112*d* of the housing 11*a*. In the first step S11, this mating-side lock portion 21 is in contact with the full lock-receiving portion 112*d*-2*b* on the opposite of the locking bridge 112*d*-2 from the locking end face 112*d*-2*a*.

In the second step S12 in which the mating connector 2 slightly makes progress in the mating process with the connector 1, the mating-side lock portion 21 passes over the locking bridge 112*d*-2 while deflecting the mating locking arm 112*d* toward the CPA movement surface 112*a*. At this occasion, the front end portion is pushed by the locking bridge 112*d*-2, and the CPA member 12 is inclined toward the CPA movement surface 112*a*.

In a third step S13 in which mating of the mating connector 2 with the connector 1 is completed, the mating-side lock portion 21 passes over the locking bridge 112*d*-2 to lock to the locking end face 112*d*-2*a*. Then, the mating-side lock portion 21 pushes the end portion protrusion 122*a* of the CPA member 12, of which the movement inhibition end face 122*a*-1 was in contact with locking end face 112*d*-2*a* in the temporarily locked state, toward the CPA movement surface 112*a* while deflecting the CPA arm 122. According to this pushing, the movement inhibition end face 122*a*-1 is detached from the locking end face 112*d*-2*a*, which releases movement inhibition of the CPA member 12.

In a fourth step S14 in which mating of the mating connector 2 with the connector 1 is completed, the CPA member 12 which has been released from the movement inhibition is pushed in the movement direction D12 to transit to the fully locked state. In the fully locked state, the end portion protrusion 122*a* of the CPA arm 122 passes under the locking bridge 112*d*-2, and the full lock end face 122*a*-2 on the rear side in the movement direction D12 latches to the full lock-receiving portion 112*d*-2*b* of the locking bridge 112*d*-2.

Then, in the fully locked state, as illustrated in FIG. 5, the CPA-side protrusion 123 is on the front side in the movement direction D12 away from the housing-side protrusion 113, and there remains a clearance d11 between the CPA-side protrusion 123 and the CPA movement surface 112*a*.

In order to release the mating between the connector 1 and the mating connector 2, before the mating release, first, the CPA member 12 is returned from the fully locked state to the temporarily locked state. At this occasion, by utilizing the above clearance d11, the worker pushes the full lock release-receiving portion 122*b* adjacent to the CPA-side protrusion 123 in the width direction D13. With this pushing, the CPA arm 122 in a cantilever shape is deflected toward the CPA movement surface 112*a*, and the full lock end face 122*a*-2 of the end portion protrusion 122*a* on the front end side is detached from the full lock-receiving portion 112*d*-2*b* of the locking bridge 112*d*-2, so that the full lock is released. Thereafter, the CPA member 12 is pulled in the direction opposite to the movement direction D12 to return back to the temporarily locked state, which enables releasing of mating with the mating connector 2.

According to the connector 1 of the embodiment described above, in the temporarily locked state, the of housing-side protrusions 113 provided on the CPA movement surface 112*a* is in contact with the pair of CPA-side protrusions 123 provided on the CPA arm 122. With this contact, unintended deflection of the CPA arm 122 is alleviated in the temporarily locked state. In addition, the CPA-side protrusions 123 protrude from the side edges of the CPA arm 122 in the width direction D13, and the housing-side protrusions 113 are provided at positions that do not overlap with the CPA arm 122. Because the CPA-side protrusions 123 do not overlap with the CPA arm 122, deflection deformation of the CPA arm 122 due to mating with the mating connector 2 is not hindered. The housing-side protrusions 113 are provided at positions that come out of contact with the CPA-side protrusions 123 in the fully locked state, and therefore, when mating with the mating connector 2 is released, deflection deformation of the CPA arm 122 for releasing the full lock of the CPA member 12 is not hindered either. As described above, according to the present embodiment, unintended deflection of the CPA arm 122 of the CPA member 12 in the temporarily locked state can be alleviated without interfering with the original operation of the CPA member 12.

Here, in the present embodiment, the full lock release-receiving portion 122*b* for receiving a full lock release operation is formed in a protruding manner on the CPA arm 122, and the pair of CPA-side protrusions 123 protrudes from a position adjacent to the full lock release-receiving portion 122*b*. According to this configuration, the CPA-side protrusions 123 are provided at positions adjacent to the full lock release-receiving portion 122*b* that is formed in a protruding manner for a full lock release operation by a worker and that is more likely to receive external force than other portions. Because the CPA-side protrusions 123 are provided such positions and are in contact with the housing-side protrusions 113 in the temporarily locked state, unintended deflection of the CPA arm 122 when receiving external force can be effectively alleviated.

Furthermore, in the present embodiment, the CPA arm 122 is formed such that the length L12 of the portion between the CPA-side protrusions 123 and the free end side is the length L11 of the portion between the CPA-side protrusions 123 and the fixed end side. According to this configuration, the portion of the CPA arm 122 between the CPA-side protrusion 123 and the free end side, which functions substantially as a cantilever in the temporarily locked state, is longer. Because the portion on the free end side is longer, the free end side of the CPA arm 122 is effectively deflected by the mating with the mating connector 2, so that the movement inhibition of the CPA member 12 can be released.

Furthermore, in the present embodiment, the pair of CPA-side protrusions 123 is such that the CPA front side-inclined surface 123*a* is formed on the front side, in the movement direction D12, of each of the CPA-side protrusions 123. The pair of housing-side protrusions 113 is such that the housing-side-inclined surface 113*a* is formed on the rear side, in the movement direction D12, of each of the housing-side protrusions 113. According to this configuration, when the CPA member 12 is attached to the housing in the temporarily locked state, first, the CPA front side-inclined surfaces 123*a* of the CPA-side protrusions 123 face the housing-side-inclined surfaces 113*a* of the housing-side protrusions 113. Thereafter, the CPA front side-inclined surfaces 123*a* slide on the housing-side-inclined surfaces 113*a*, and the CPA-side protrusions 123 smoothly ride over the housing-side protrusions 113, so that the contact state therebetween is established, and therefore, the CPA member 12 can be attached with good workability.

Furthermore, in the present embodiment, the pair of CPA-side protrusions 123 is such that the CPA rear side-inclined surface 123*b* is formed on the rear side, in the movement direction D12, of each of the CPA-side protrusions 123. According to this configuration, when, before release of mating, the CPA member 12 in the fully locked state is returned back to the temporarily locked state, the CPA rear side-inclined surfaces 123*b* slide on the housing-side protrusions 113. With this sliding, the CPA-side protrusions 123 smoothly ride over the housing-side protrusions 113, so that the contact state therebetween is established. At this occasion, because the housing-side protrusions 113 are not provided with any inclined surface corresponding to the CPA rear side-inclined surfaces 123*b*, a situation such as where, e.g., the CPA member 12 in the fully locked state is returned back to the temporarily locked state is alleviated, so that stability of the fully locked state is ensured. In this way, according to the above configuration, while ensuring the stability of the fully locked state, the CPA member 12 can be moved with good workability when the CPA member 12 is returned from the fully locked state to the temporarily locked state prior to release of mating, Note that the embodiments described above merely illustrate typical forms of the connector. The connector is not limited thereto, and can be implemented with various modifications.

For example, according to the above-described embodiment, the connector 1 used as an end portion connector of a wire harness mounted on a vehicle or the like is illustrated as an example of the connector. However, the connector is not limited thereto, and the specific target of application can be anything.

Furthermore, according to the above-described embodiment, the housing 11*a* having an appearance of a rectangular block is illustrated as an example of the housing. However, the housing is not limited thereto, and any shape may be adopted as a specific external shape and the like.

Furthermore, according to the above-described embodiment, the pair of CPA-side protrusions 123 provided at positions adjacent to the full lock release-receiving portion 122*b* formed to protrude from the CPA arm 122 is illustrated as an example of the pair of CPA-side protrusions. However, the pair of CPA-side protrusions is not limited thereto, and the installation positions thereof can be set as appropriate. However, when the CPA-side protrusions 123 are provided at positions adjacent to the full lock release-receiving portion 122*b*, unintentional deflection of the CPA arm 122 when subjected to external force can be effectively alleviated, as described above.

Furthermore, according to the above-described embodiment, the CPA arm 122 in which the length L12 of the portion between the pair of CPA-side protrusions 123 and the free end side is longer than the length L11 of the portion between the pair of CPA-side protrusions 123 and the fixed end side is illustrated as an example of the CPA arm. However, the CPA arm is not limited thereto, and may be formed so that the free end side is shorter, contrary to the above. However, when the free end side is longer, the free end side of the CPA arm 122 can be effectively deflected to release the movement inhibition of the CPA member 12, as described above.

Furthermore, according to the above-described embodiment, the housing-side protrusion 113 in which the CPA-side protrusions 123 formed with the CPA front side-inclined surface 123*a* and the housing-side-inclined surfaces 113*a* are formed is illustrated as an example of the CPA-side protrusions and the housing-side protrusions. However, the CPA-side protrusions and the housing-side protrusions are not limited thereto, and the inclined surfaces as described above may not be provided on any of the CPA-side protrusions and the housing-side protrusions. However, when the CPA front side-inclined surfaces 123*a* are provide on the CPA-side protrusions 123 and the housing-side-inclined surfaces 113*a* are provided on the housing-side protrusions 113, the CPA member 12 may be attached with good workability, as described above.

Furthermore, according to the above-described embodiment, the CPA-side protrusions 123 formed with the CPA rear side-inclined surfaces 123*b* are illustrated as an example of the CPA-side protrusions. However, the CPA-side protrusions are not limited thereto, and any inclined surface may not be provided on the rear side in the movement direction. However, when the CPA rear side-inclined surfaces 123*b* are provided, the CPA members 12 can be moved with good workability to return the CPA member 12 in the fully locked state back to the temporarily locked state, as described above.

LIST OF REFERENCE SIGNS

1 connector
2 mating connector
11 connector body
11*a* housing
11*b* connector terminal
11*c* spacer
12 CPA member
21 mating-side lock portion
111 housing
111*a* cavity
112 CPA-receiving portion
112*a* CPA movement surface
112*b* CPA-receiving space
112*c* side wall ribs
112*d* mating locking arm
112*d*-1 arm portion
112*d*-2 locking bridge
112*d*-2*a* locking end face
112*d*-2*b* full lock-receiving portion
112*d*-3 lock release operation-receiving portion
112*e* housing-side temporary locking protrusion
113 housing-side protrusion
113*a* housing-side-inclined surface
113*b* housing-side non-inclined surface
121 CPA body
121*a* full lock operation-receiving portion
121*b* side frame portion
121*c* CPA-side temporary locking protrusion
122 CPA arm
122*a* end portion protrusion
122*a*-1 movement inhibition end face
122*a*-2 full lock end face
122*b* full lock release-receiving portion
122*c* side edge
123 CPA-side protrusion
123*a* CPA front side-inclined surface
123*b* CPA rear side-inclined surface
d11 clearance
D11 mating direction
D12 movement direction
D13 width direction
L11, L12 length
W1 electric wire

What is claimed is:

1. A connector comprising:

a connector body in which a connector terminal is accommodated in a cavity of a housing; and a CPA member configured to be attached to the housing in a temporarily locked state and configured to, before mating of the connector body with a mating connector, inhibit movement in a movement direction along a mating direction, the CPA member being configured to, when the inhibition is released by the mating, transit to a fully locked state by moving in the movement direction, so that the CPA member guarantees the mating, wherein the CPA member includes:

a CPA body configured to temporarily lock to the housing and receive a transition operation to the fully locked state on a rear side in the movement direction;

a CPA arm being a cantilever extending in the movement direction from the CPA body, the CPA arm configured to, before the mating, inhibit the movement by bringing an end portion on a free end side of the CPA arm to come into contact with the housing, and configured to release the inhibition due to the mating and make a full lock at the end portion; and a pair of CPA-side protrusions protruding in a width direction of the CPA arm from an intermediate position between the fixed end side and the free end side on each of side edges, constituting a pair, of the CPA arm, wherein the housing includes:

a housing body provided with the cavity;

a CPA-receiving portion that defines, of an outer peripheral surface of the housing body, a CPA-receiving space for receiving the CPA member, with a bottom surface of the CPA-receiving space being a CPA movement surface on which the CPA member moves, the CPA body temporarily locking to the CPA-receiving portion in the temporarily locked state, and the end portion of the CPA arm fully locking to the CPA-receiving portion in the fully locked state; and a pair of housing-side protrusions formed in a protruding manner on the CPA movement surface at such a position that the pair of housing-side protrusions does not overlap with the CPA arm in a top view of the CPA movement surface and that the pair of housing-side protrusions comes into contact with the pair of CPA-side protrusions in the temporarily locked state and comes out of contact with the pair of CPA-side protrusions in the fully locked state.

2. The connector according to claim 1, wherein the CPA arm is formed with a full lock release-receiving portion in a protruding manner at the intermediate position between the fixed end side and the free end side on an outer surface on an opposite side from the CPA movement surface, the full lock release-receiving portion being configured to receive a full lock release operation for deflecting the CPA arm to release the full lock of the end portion in the fully locked state, and wherein the pair of CPA-side protrusions protrudes from a position, on each of the side edges constituting the pair, adjacent to the full lock release-receiving portion.

3. The connector according to claim 1, wherein the CPA arm is formed such that a length of a portion between the pair of CPA-side protrusions and the free end side is longer than a length of a portion between the pair of CPA-side protrusions and the fixed end side.

4. The connector according to claim 1, wherein each of the CPA-side protrusions constituting the pair is formed with a CPA front side-inclined surface on a front side in the movement direction of the CPA-side protrusion, the CPA front side-inclined surface being inclined such that a distance from the CPA movement surface gradually increases in the movement direction, and wherein each of the housing-side protrusions constituting the pair is formed with a housing side-inclined surface on a rear side in the movement direction of the housing-side protrusion, the housing side-inclined surface being inclined such that a protruding height from the CPA movement surface gradually increases in the movement direction.

5. The connector according to claim 4, wherein each of the CPA-side protrusions constituting the pair is formed with a CPA rear side-inclined surface on a rear side in the movement direction of the CPA-side protrusion, the CPA rear side-inclined surface being inclined such that a distance from the CPA movement surface gradually decreases in the movement direction.

* * * * *